United States Patent [19]

Bunker

[11] Patent Number: 6,018,398
[45] Date of Patent: Jan. 25, 2000

[54] DUPLEX PRINTING METHOD FOR A SIMPLEX ONLY PRINTER BY ELECTRONICALLY SEPARATING OPPOSITE SIDE PAGE IMAGES FOR DELAYED AUTOMATIC PRINTING

[75] Inventor: Keith G. Bunker, Hilton, N.Y.

[73] Assignee: Xerox Corporation, Stamford, Conn.

[21] Appl. No.: 08/781,364

[22] Filed: Jan. 21, 1997

[51] Int. Cl.⁷ .................................................. G06F 15/00
[52] U.S. Cl. ........................................ 358/1.15; 358/1.16
[58] Field of Search ............................... 399/364; 355/79, 355/23, 77; 377/97; 395/111; 358/1.12, 1.15, 1.16, 1.17

[56] References Cited

U.S. PATENT DOCUMENTS

| | | | |
|---|---|---|---|
| 4,313,673 | 2/1982 | Wartinger et al. | 355/14 R |
| 4,843,571 | 6/1989 | Notermans et al. | 364/519 |
| 5,467,434 | 11/1995 | Hower, Jr. et al. | 395/114 |
| 5,493,634 | 2/1996 | Bonk et al. | 395/101 |

OTHER PUBLICATIONS

Xerox Disclosure Journal, vol. 4, No. 3, p. 403, John F. O'Brien, Duplex Document Handler, May 1979.

Primary Examiner—Andrew W. Johns

[57] ABSTRACT

A simplified process for duplex printing on a simplex-only printing system in which plural page document duplex electronic print jobs generated with a duplex printing control signal are sent to be printed. If such duplex print jobs are sent to a duplex printer then they are printed normally without user interactive intervention. However, when such duplex print jobs are sent to a simplex printing system which does not have automatic duplex printing capability, then, the simplex printing system detects the duplex printing control and temporarily electronically stores the duplex print job until a duplex document printing command signal is entered, whereupon, the duplex print job is automatically split up into two different split simplex electronic print jobs, of alternate first and second side pages, and only the first side pages are initially printed and outputted, and then the simplex printing system automatically pauses to wait for these copy sheets printed on only their first sides to be reloaded into the copy sheets input of the simplex printing system, and for a second sides print command, whereupon the other, second, sides, are automatically printed on the copy sheets to produce a complete collated plural page duplex printed print job. The simplex printing system can automatically determine whether the first sides to be printed are printed with the odd pages or the even pages. The duplex document printing command signal is preferably entered into the interactive user interface of the simplex printing system by a user then present.

5 Claims, 5 Drawing Sheets

DUPLEX PRINTING METHOD FOR A SIMPLEX ONLY PRINTER BY ELECTRONICALLY SEPARATING OPPOSITE SIDE PAGE IMAGES FOR DELAYED AUTOMATIC PRINTING

Disclosed is a simplified and interactive process for producing duplex (two sided) printed copy sheets on an electronic printer only having simplex (one sided) printing capability.

There is extensive patent literature and products on duplex printing in various electronic printers, including laser xerographic printers, ink jet printers, etc. However, these are typically duplex printers with automatic copy sheet inverters and return paths for automatic second side printing, such as Xerox Corp. U.S. Pat. Nos. 5,337,135 or 4,928,128. Those added printer features for duplexing require additional space and cost.

It is also known to provide duplex copying on a simplex copier by manually taking copy sheets imaged on one side from the copy sheet output tray and manually reloading those sheets back into a paper input tray, inverted, and then imaging their second sides, although this has difficulties in insuring that the correct sequential second side pages are imaged in the correct sequence on the backs of the correct first side page sheets, i.e., correctly collated and immediately sequential second side page numbers.

One example of such a manual duplex copying system, using an automatic original document feeder, is disclosed in the Xerox Disclosure Journal publication Vol.4, No. 3, p.403 of May/June 1979 by John F. O'Brien. Also noted as to display prompts for manual manipulation of the original documents in a document handler for duplexing is Xerox Corp. U.S. Pat. No. 4,313,673.

Further by way of background, it is known to provide a feature for certain electronic printers, as well as certain facsimile machines, which allows an operator (user) to have a print job or jobs held in electronic memory and not printed until the user releases it by coming up to the printer and entering a print signal, which feature can be called a "secure print" or electronic "mailbox" feature (not to be confused with hardcopy mailboxing systems). An example of such a "hold and release" printing system patent is OcéU.S. Pat. No. 4,843,571. Also known is a "proof set" feature in which the printer prints out only one first copy set of the print job and waits for the user to review it, i.e., the printer will not print the remaining designated number of print sets until the user releases the printer to print them after inspecting the printed proof set.

It is also known to provide "job tickets" and/or page description language (PDL) print job instructions, which can provide electronic document identifiers and various printing and finishing instructions, including keystroke entry or default instructions for duplex (both sides) printing versus simplex (one side only) printing, as well as the electronic addresses of selected or default printers connected to that, or another, electronic network or system, etc. Cited merely as two recent examples are Xerox Corp. U.S. Pat. Nos. 5,467, 434 and 5,493,634. "Printing" here will be understood as any of various selected hardcopy printing systems, as further defined below.

The disclosed system may be operated and controlled by appropriate operation of conventional control systems. By way of general background, it is well known and preferable in reproduction apparatus to program and execute imaging, printing, paper handling, and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs. It is well known that the control of copy sheet handling systems may be accomplished by conventionally actuating them with signals from a microprocessor controller directly or indirectly in response to simple programmed commands, and/or from selected actuation or non-actuation of conventional switch inputs such as switches selecting the number of copies to be made in that job or run, selecting simplex or duplex copying, selecting a copy sheet supply tray, etc. The resultant controller signals may conventionally actuate various conventional electrical solenoid or cam-controlled sheet deflector fingers, motors or clutches, or other components, in programmed steps or sequences. Conventional sheet path sensors or switches connected to the controller may be utilized for sensing, counting, and timing the positions of sheets in the sheet paths of the reproduction apparatus, and thereby also controlling the operation of sheet feeders, etc., as is well known in the art.

In the description herein the term "sheet" refers to a usually flimsy physical sheet of paper, plastic, or other suitable physical substrate for images, whether precut or web fed. A "copy sheet" may be abbreviated as a "copy", or called a "hardcopy". A "simplex" document or copy sheet is one having its image and any page number on only one side or face of the sheet, whereas a "duplex" document or copy sheet has "pages", and normally images, on both sides, i. e., each duplex sheet is considered to have two opposing sides or "pages" even though no physical page number may be present.

Further by way of general background, it will be appreciated that in a modern system or networked document generation, transmission and printing environment, various control and/or software functions described herein may be done in the network system print server or controller rather than in the printer unit per se. Likewise, as is also known, various user interactions, control and status displays with, for, and from the printing apparatus and its operations can be on and from the terminals or PC's of individual networked users. Control signals and terminal display interactive interfaces between user remote terminals and electronic printers in general are known and commercially available and need not be described in detail herein. Further examples of patents relating to network environments of plural remote terminal shared users of networked printers include Xerox Corporation U.S. Pat. Nos. 4,453,128; 5,170,340; 5,226,112; 5,243,518; 5,287,194; EPO 0529818A3 pub. 03.03.93; and GB 2198566A pub. Jun. 15, 1988. Some patents on this subject by others include U.S. Pat. Nos. 4,623,244; 4,651,278; 4,760,458; 4,821,107; 4,903,229; 4,953,080; 5,113,355; 5,113,494; 5,181,162; 5,220,674;5,247,670 and 5,371,837. Further by way of background, some of the following Xerox Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Some of these patents also disclose "multifunction" machines, such as digital printer/scanner/facsimile/copier machines, and their controls, which are encompassed by the term "printer" as used herein.

Some other network systems related publications include "Xerox Office Systems Technology . . . Xerox 8000 Series Products: Workstations, Services, Ethernet, and Software Development"©1982, 1984 by Xerox Corporation, OSDR8203A Ed. T. Linden and E. Harslem, with a "Table of Contents" citing its numerous prior publications sources, and an Abstract noting the April 1981 announcement of "the 8110 Star Informations System, a new personal computer . . . "; "Xerox System Integration Standard Printing Protocol XSIS 118404", April 1984; "Xerox Integrated Production Publishers Solutions: . . . " Booklet No. "610P50807 " "11/85"; "Printing Protocol-Xerox System Integration Standard " ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress®: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Also noted by way of background as to commercial network systems with printers and software therefor is the 1992 Xerox Corporation "Network Publisher" version of the 1990"DocuTech®" publishing system, including the "Network Server" to customer's Novell® 3.11 networks, supporting various different network protocols and "EthernetTM™"; and the Interpress Electronic Printing Standard, Version 3.0, Xerox System Integration Standard XNSS 048601 (January 1986). Also, the much earlier Xerox Corporation "9700™" electronic printing System"; the "VP Local Laser Printing" software application package, which, together with the Xerox "4045™" or other Laser Copier/Printer, the "6085™" "Professional Computer System" using Xerox Corporation "ViewPoint™" or "GlobalView™" software and a "local printer (print service) Option" kit, comprises the "Documenter" system. The even earlier Xerox Corporation "8000" "Xerox Network Services Product Descriptions" further describe other earlier Xerox Corporation electronic document printing systems. Eastman Kodak "LionHeart"® digital printing systems, first announced Sep. 13, 1990, are also noted. Current popular commercial "systems software", including LAN workstation connections, is available from Novell®, Microsoft® Windows® and IBM OS/2®.

As to specific components of the subject or exemplary software or apparatus for use therewith, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for teachings of additional or alternative details, features, and/or technical background. What is well known to those skilled in the art need not be described here.

Various of the above-mentioned and further features and advantages will be apparent from the specific system and its operation described in the example below, and the claims. Thus, the present invention will be better understood from this description of a specific embodiment, including the drawing figures (approximately to scale) wherein:

FIG. 1 also illustrates one step of the exemplary method being used with this printer, in which a duplex print job sent to this simplex printer is being initially held rather than printed;

Figure 1:
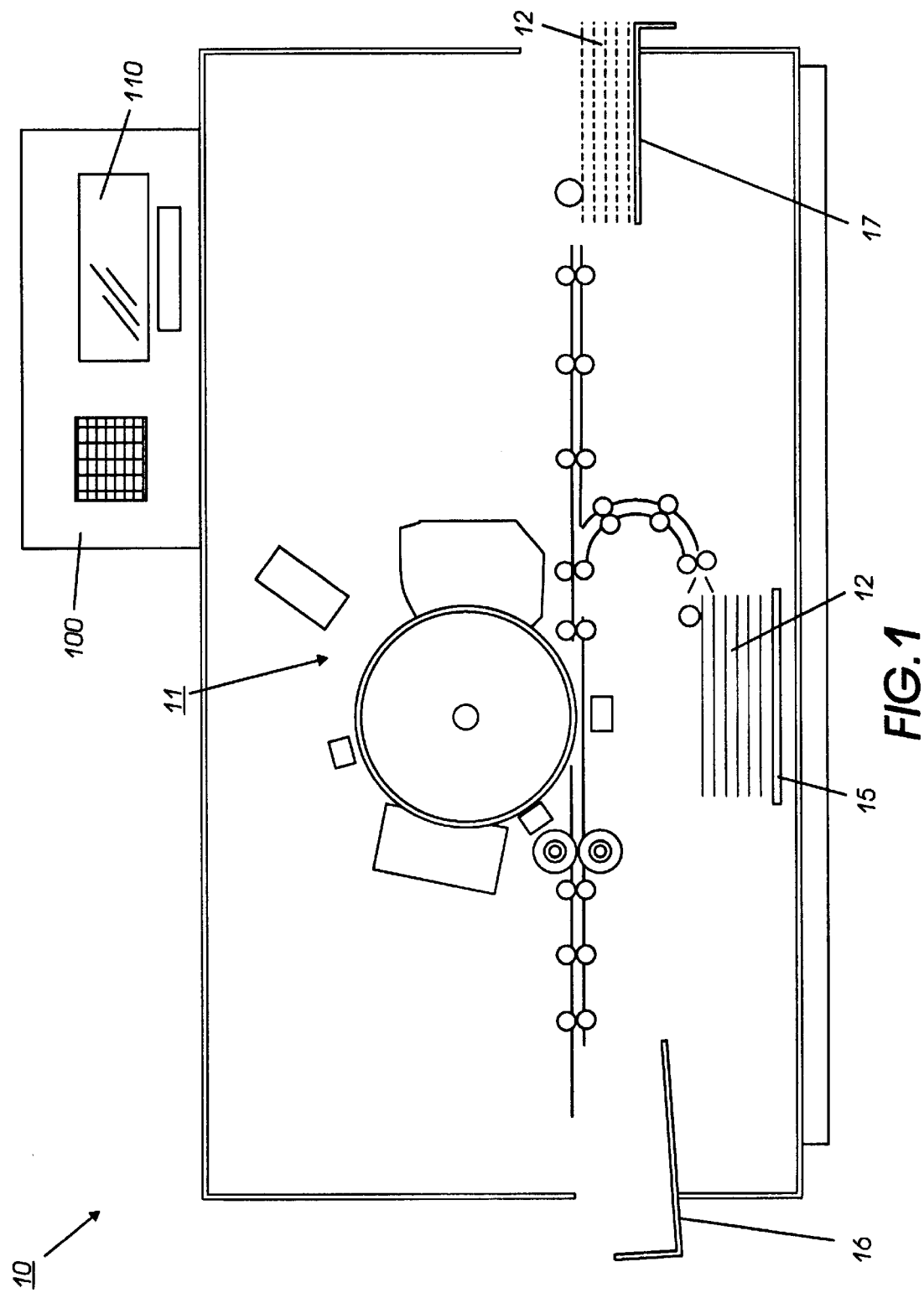
FIG. 1 is a schematic side view of a conventional exemplary simplex electronic printer with which the present system can be utilized.
Figure 2:
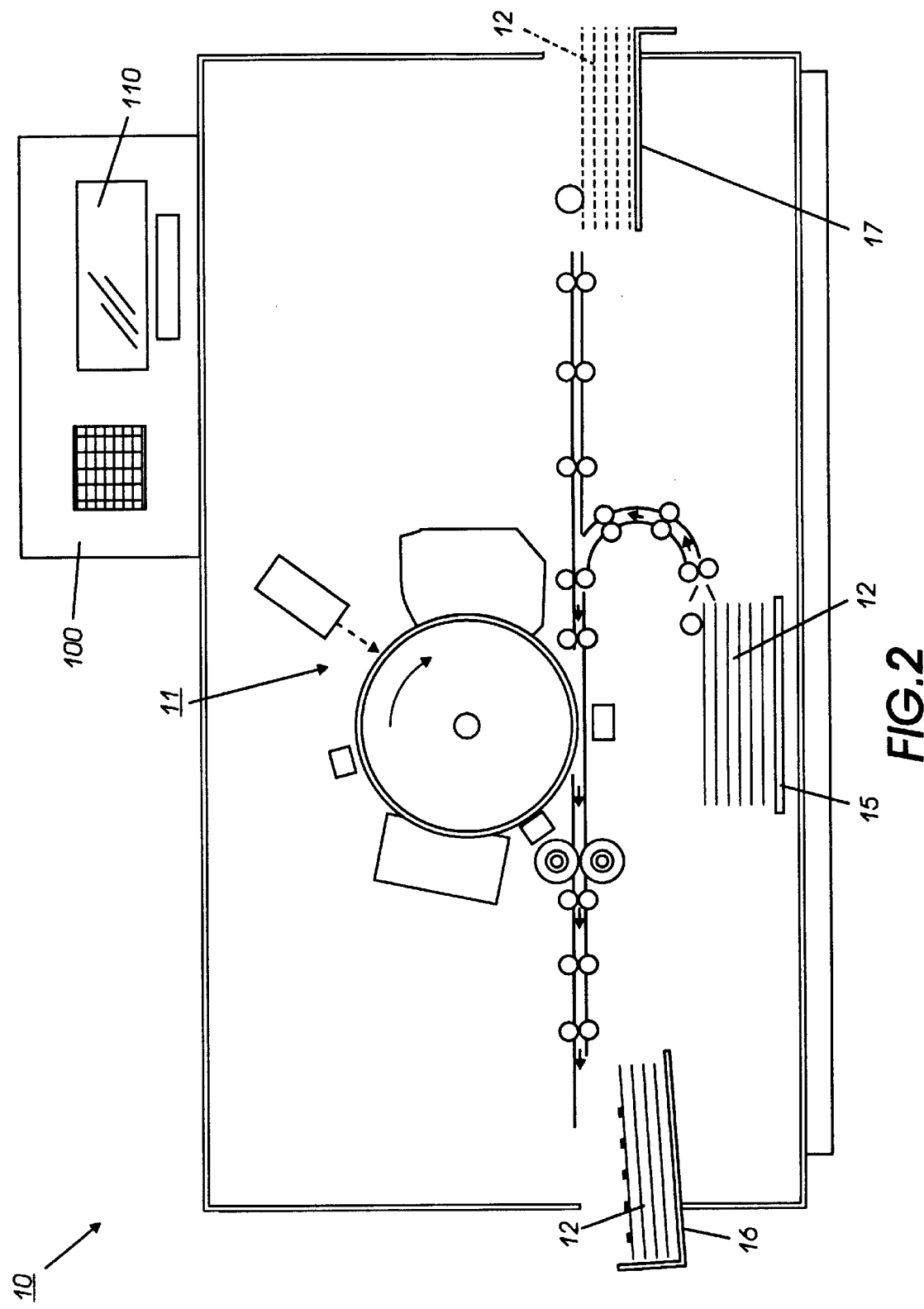
FIG. 2 illustrates a second step of said method in this particular configuration in which only the copy sheets even page or second sides, alternate pages, are printed and outputted at an output tray in response to user input release of the duplex print job.
Figure 3:
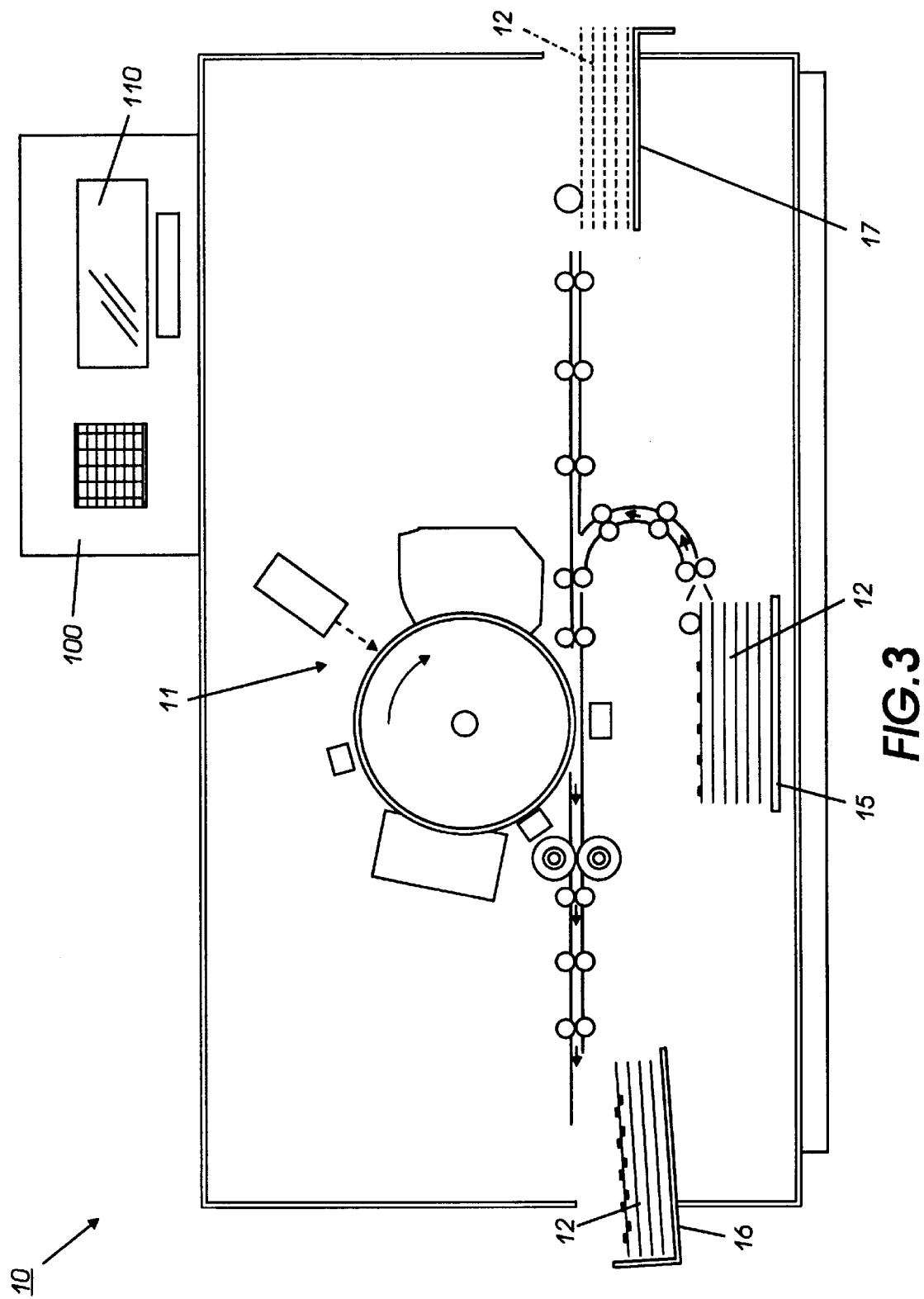
FIG. 3 illustrates a third step of said method, wherein said second side printed copy sheets have been removed from the output tray, and inserted in an input tray, these sheets are inverted, and the printer restarted to print the second sides of the copy sheets with the remainder of the split duplex print job to output collated duplex copies.
Figure 4:
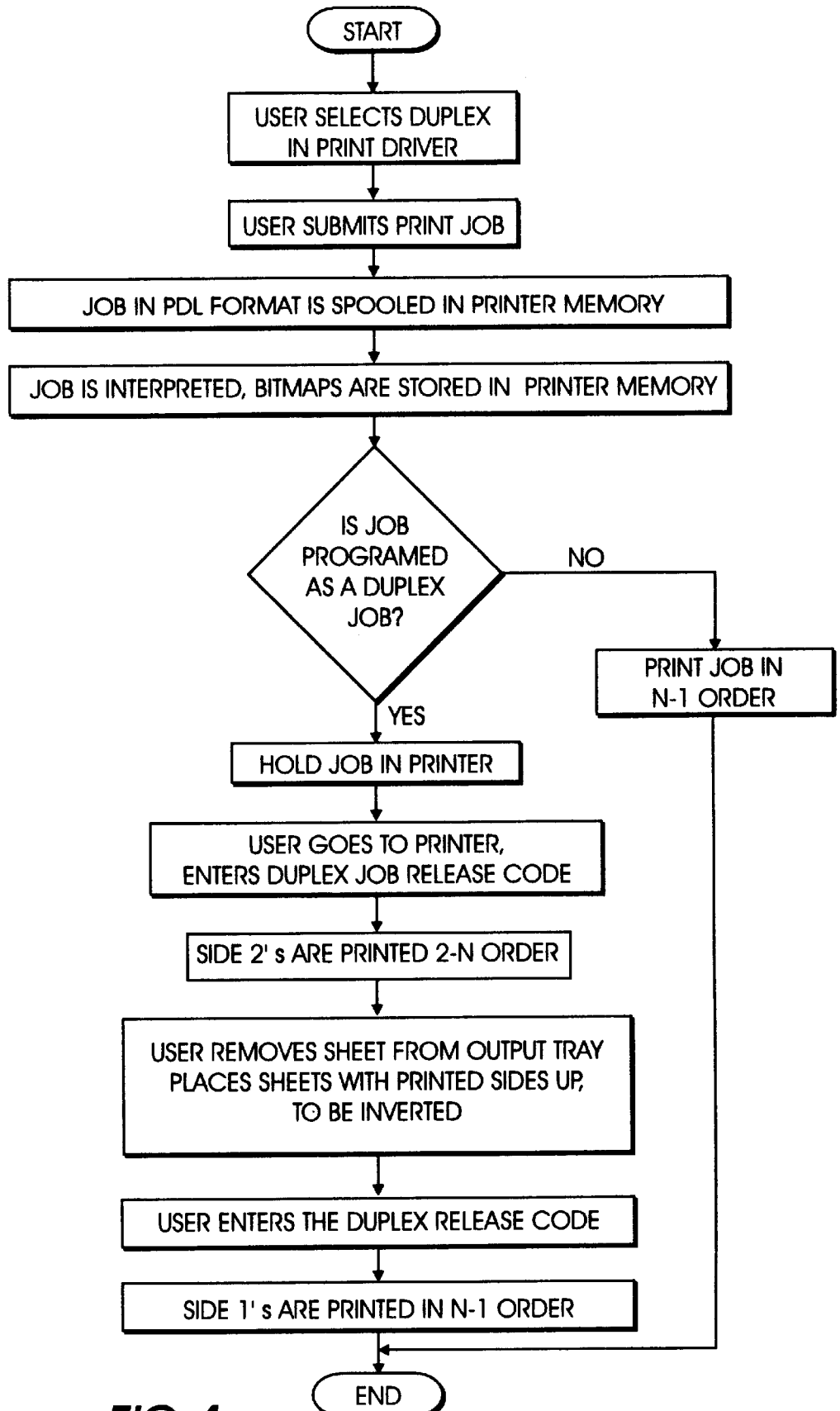
Figure 5:
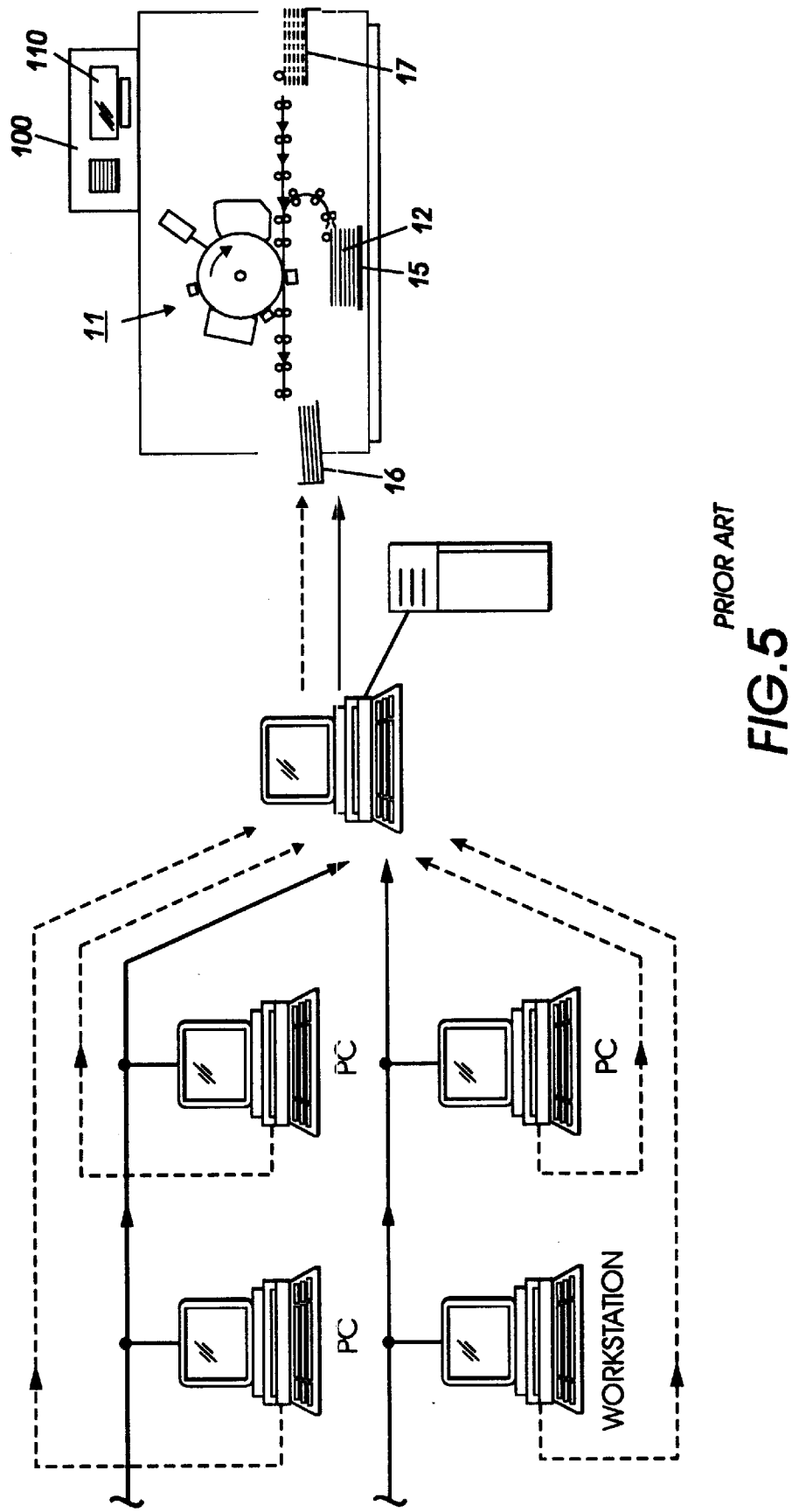

FIG. 4 is an exemplary flow chart of the subject exemplary process, for this particular example of a simplex printer which inverts copy sheets before printing them from the tray shown in use, prints them face up, and exits or outputs the sheets without any inversion face up; and FIG. 5, labeled "prior art", schematically shows a typical office network system of distributed user's PC's or other user terminals electronically connected to send print jobs to a shared print server and a printer as in FIGS. 1–3.

Referring to the Figs., there is shown one example of a simplex reproduction apparatus or machine, in this example a simplex-only electronic printer or printing system 10 with a conventional software programmable microprocessor controller 100 with a graphical user interface (GUI) 110 to input control or command signals. The simplex printing system 10 also conventionally has an imaging system 11 which prints images on one side only of copy sheets 12 fed from a selected source of such sheets 12 such as an input paper tray 15, here a conventional paper drawer or cassette. Here, in this particular printer 10 example, the sheets 12, after they are printed on their top sides (face up), are conventionally outputted face up from the machine 10 at an output stacking tray 16. This is merely one of various possible known linear or inversion paper paths and face up or face down printing systems. It will be appreciated, as is well known, that there may be more than one paper, feed or input tray 15 for the printer 10. In particular, it is now common to provide a special external bypass sheet input tray such as tray 17 shown here which is readily accessible for loading copy sheets therein from the outside of the machine, without requiring opening or removal of a paper drawer or cassette to insert copy sheets into the machine. Such an externally loaded bypass sheet insert tray 17 thus can be a desirable feature for use with the present system, but is not essential. If the tray 17 would be used in this example for duplexing, the stack of sheets printed on only one side would be manually inverted before insertion into tray 17, and the page order of the printing changed, whereas the paper path from the tray 15 here inverts the sheets automatically as they are fed so that manual inversion is not required.

As with most printing systems, the simplex printing system 10 has operatively associated therewith, directly or indirectly, as in a system spooler or server, electronic storage capability for temporarily electronically storing print jobs before they are printed. Preferably there is sufficient memory for queuing several print jobs and ordering or reordering their job printing order or priority, and their page order of printing, as is well known per se.

Describing the exemplary method and its operation generally, a duplex printing command can be sent electronically with an electronic print job, and when that electronic print job is sent to a simplex printer, a "hold" print job storing command can be automatically generated for that job, and stored or spooled in electronic memory until a user or operator at that simplex printer is at that printer location and available to do manual duplexing, and then instructs the printer by a print command to do duplex printing, such as by entering a document identification number into the printer controller keypad, touch screen, or other graphical user interface (GUI), which unlocks the special "hold" print job storing command and also causes the simplex printer to then print alternate, first side only, pages of the print job, and then to stop or pause, for the reloading into the printer input tray of those first side printed sheets for their second side printing, and then to print the alternate opposite side pages, so as to print correctly collated duplex jobs. More particularly, the user must explicitly release the duplex print job to print in the simplex printer, such as by entering a job or document identification number, to give the user control over the initiation of the duplex printing method. The first side pages are first unlocked to be printed by the user, and then the remaining, second side, pages are unlocked by the user to be printed.

To express it another way, the user can conventionally electronically designate in advance a multi-page electronic document print job to be duplex printed, e.g., by keystroke entry on a job ticket or PDL software, as is well known per se. E.g., in "Interpress" or its other PDL descendants, the person generating or directing printing of the document can simply select "PLX ON" or "PLX 2" or the like available selections to select duplex printing. The same electronic document print job can also be assigned a document identification number, either by the user, or automatically as the document is generated, as is also known per se. When that duplex document or print job is sent or directed to a duplex printer it can be printed as soon as that duplex printer is ready to print that job, or reaches it in the print queue, without a delay or further special command. However, when that same or another duplex document or print job is sent or directed to a simplex-only printer, such as 10, it will automatically be treated differently by that simplex printer. It will be treated by the simplex printer as a "held" job, like or as if it were a "secure print" job described above. Only when the document sender, printer operator, secretary or other printer user is physically present at that simplex-only printer, and ready to print the desired duplex print job, or jobs, the printer user then can "recall" the duplex print job(s) at the printer via a document print job and/or user ID number entry. However, even then the simplex printer will not print normally. The simplex printer will automatically go into a special printing mode in which the software in the printer or print server, or a micro or applet associated with the print job, separates the electronic job into odd an even page images, i.e., a single plural page document duplex print job is split up into two different simplex print jobs of alternate pages of the duplex print job. Only the first, alternate side, e.g., odd side, pages of the duplex print job are all initially printed onto one side of sequential copy sheets, and then the printer pauses. After these printed sheets are reloaded inverted into the printer input, and another print command is given to the printer, the printer software then successively prints all the other, alternate, page images. e.g., the even pages, onto the backsides of these sheets as they successively feed through the printer.

Whether the printer 10 should print odd pages first and even page second, or vice versa, is a function of the printer 10 architecture, such as whether the machine 10 prints on top of the sheets 12 (face up) or on the bottom of the sheets (face down) and whether there are any natural inversions in the paper path of the sheets in the printer after they are printed an before they are outputted into tray 16. Since this is fixed and known for any given printer, the printer 10 software in the controller 100 can automatically decide which sides to print first and which sides to print second. As noted, the FIG. 5 example of the exemplary process is for this particular example of a simplex printer 10 which naturally inverts copy sheets once in its paper path between the tray 15 and the image transfer station for printing them, which prints the sheets face up on their then top sides (printing on the side opposite the side that was facing down in the paper tray 15), and the printed sheets then exit straight out to exit tray 16 without any inversion to stack in tray 16 face up.

However, the present system is also usable with only slight modifications in many other simplex printer architectures, such as with the above-noted change in whether odd or even pages are printed first. E.g., with printers providing a straight paper path without inversions, as from auxiliary input tray 17 here, printed either face up or face down, printers with an inversion in the output path for face down stacking, etc. That is, well known alternative printing systems may have an inversion in the output paper path between the image transfer station and the output tray, and/or bottom rather than top printing, etc. As with the alternative paper input tray 17 here, some of these various well known alternative printer configurations and paper paths may require manually turning over (inverting) the first side printed sheets before reinserting them in a paper feed or input tray for their second side printing. These different printer configurations or paper paths may alternatively or additionally require changing the page printing order of one of the sides of the sheets from forward or 1 to N order to reverse or N to 1 order, and/or changing whether the odd numbered page sides or the even numbered page sides should be printed first, to achieve properly collated output, as is all well known to those skilled in the art. Thus the terms "first" and "second" sides as used herein can be either even or odd pages, depending on the particular printing paper path.

Another advantage of the system disclosed herein applicable to any such paper paths is that the conventional existing top sheet paper feeders and paper trays can desirably be used. In contrast, many duplex printing systems require a special dedicated duplex tray with a more difficult bottom sheet feeder, and/or an additional dedicated duplex sheet feeding loop.

The disclosed system enables a simple simplex printer without any inverter, and only a simple face down output sheet stacker such as 16, to print properly collated duplex print jobs with only a simple interaction with an interactive printer, activated merely by entry of a electronic document ID number. Furthermore, automatic and interactive prompts can be given the operator via the GUI 110. For example, if the first side copies have not been reloaded back into an input tray 15 or 17 for their second side printing, as instructed on the GUI, this can be detected by the absence of available electrical signals indicating that the drawer or cassette of tray 15 has not been opened and closed, or the sheet input sensor of tray 17 has not been triggered.

Note that the subject process is actuated in response to the machine 10 automatic selection in controller 100 of duplex copying by the duplex job identifier on the electronic print job, and the operator input of the job identifier.

It will be appreciated that, as is well known, the printer 10 controller 100 and/or the network print server(s) will desirably be configured to "print around" these and other "held" print jobs. That is, to print other jobs in the print queue which can be printed immediately without any delay for any further operator interaction, such as later sent simplex print jobs. It will also be appreciated that, as is well known, the selection of duplex printing, even if not done on the electronic document itself, may be done by automatic default selection thereof programmed into the machine 10 controller 100 non-volatile memory, or by independent or overriding operator interface switch or display panel 110 selection at the printer 10.

While the embodiment disclosed herein is preferred, it will be appreciated from this teaching that various alternatives, modifications, variations or improvements therein may be made by those skilled in the art, which are intended to be encompassed by the following claims:

I claim:

1. A method of producing collated duplex printed copy sheets on a simplex printing system which does not have automatic duplex printing capability but has an interactive user interface and has electronic document storage operatively associated therewith, said simplex printing system also having at least one copy sheets input and printed copy sheets output; wherein a plural page document duplex electronic print job is generated with a duplex printing control signal associated therewith and electronically selectably sent to a remote or local printer to be hardcopy printed; wherein if said plural page duplex document electronic print job is sent to a duplex printer with said automatic duplex printing capability then said duplex electronic print job is duplex printed normally without user interactive intervention; and wherein if said plural page duplex document electronic print job is sent to a said simplex printing system which does not have said automatic duplex printing capability; then:

if said simplex printing system detects that said plural page duplex document electronic print job has said duplex printing control signal associated therewith, then said duplex document electronic print job is temporarily held in said electronic storage associated with said simplex printing system for subsequent printing, until a duplex document printing command signal is entered into said simplex printing system, whereupon, in response to said duplex document printing command signal and the presence of a said detected plural page duplex document electronic print job held in said electronic storage operatively associated with said simplex printing system, said plural page duplex document electronic print job is automatically split up into two different split simplex electronic print jobs, of alternate, first and second sides, pages, and only said first sides pages split simplex print job of said duplex document electronic print job is initially sequentially printed onto only one side of sequential copy sheets by said simplex printing system and outputted therefrom at said printed copy sheets output, then said simplex printing system automatically pauses to wait for said copy sheets so printed on only one side to be reloaded into said copy sheets input of said simplex printing system and a second sides print command is given to said simplex printing system, whereupon, said simplex printing system then prints said other, second sides split simplex print job onto the backsides of said copy sheets from said copy sheets input and outputs the complete plural page duplex document electronic print job collated at said printed copy sheets output of said simplex printing system;

wherein said duplex document printing command signal is entered into said interactive user interface operatively associated with said simplex printing system by a user then present at said simplex printing system.

2. The method of producing collated duplex printed copy sheets on a simplex printing system of claim 1, wherein said simplex printing system automatically determines whether said first sides split simplex print job comprises the odd pages or the even pages of said plural page duplex document electronic print job.

3. The method of producing collated duplex printed copy sheets on a simplex printing system of claim 1, wherein said copy sheets so printed on only one side are reloaded inverted into said copy sheets input of said simplex printing system.

4. The method of producing collated duplex printed copy sheets on a simplex printing system of claim 1, wherein said copy sheets so printed on only one side are not reloaded inverted into said copy sheets input of said simplex printing system and are automatically inverted by said printing system after they are fed from said copy sheets input.

5. The method of producing collated duplex printed copy sheets on a simplex printing system of claim 1, wherein other electronic print jobs sent to said simplex printing system that are not said duplex electronic print jobs and do not have said duplex printing control signal associated therewith are not held in said electronic storage for said subsequent printing and are placed in a print queue to be printed without any further operator interaction with said simplex printing system.

\* \* \* \* \*